(12) United States Patent
Kuroda et al.

(10) Patent No.: US 8,087,650 B2
(45) Date of Patent: Jan. 3, 2012

(54) CLAMPING DEVICE

(75) Inventors: Takayuki Kuroda, Itami (JP); Takayuki Munechika, Itami (JP); Takao Kobayashi, Anjo (JP); Masato Sakakibara, Anjo (JP)

(73) Assignees: Pascal Engineering Corporation, Hyogo (JP); Aisin AW Co., Ltd., Aichi (JP)

( * ) Notice: Subject to any disclaimer, the term of this patent is extended or adjusted under 35 U.S.C. 154(b) by 553 days.

(21) Appl. No.: 10/587,556

(22) PCT Filed: Mar. 8, 2004

(86) PCT No.: PCT/JP2004/002997
§ 371 (c)(1),
(2), (4) Date: Sep. 14, 2006

(87) PCT Pub. No.: WO2005/084882
PCT Pub. Date: Sep. 15, 2005

(65) Prior Publication Data
US 2007/0170630 A1    Jul. 26, 2007

(51) Int. Cl.
*B23Q 5/16* (2006.01)
*B23Q 3/00* (2006.01)
*B23Q 3/08* (2006.01)
*B25B 1/24* (2006.01)
(52) U.S. Cl. .................. 269/306; 269/32; 269/263
(58) Field of Classification Search .......... 269/309, 269/310, 32, 48.1, 263
See application file for complete search history.

(56) References Cited

U.S. PATENT DOCUMENTS

| | | | |
|---|---|---|---|
| 5,746,420 A * | 5/1998 | Kohlert | 269/32 |
| 6,095,509 A * | 8/2000 | Yonezawa | 269/309 |
| 7,325,798 B2 * | 2/2008 | Yonezawa | 269/309 |
| 2003/0085500 A1 * | 5/2003 | Kohlert | 269/32 |
| 2003/0098539 A1 * | 5/2003 | Kawakami | 269/309 |
| 2004/0071563 A1 * | 4/2004 | Nagai et al. | 417/271 |
| 2005/0121846 A1 * | 6/2005 | Kawakami | 269/309 |
| 2005/0206061 A1 * | 9/2005 | Etter | 269/309 |
| 2006/0033255 A1 * | 2/2006 | Yonezawa et al. | 269/309 |
| 2006/0049569 A1 * | 3/2006 | Yonezawa | 269/309 |
| 2006/0055099 A1 * | 3/2006 | Haruna | 269/309 |
| 2006/0131803 A1 * | 6/2006 | Yonezawa | 269/309 |

FOREIGN PATENT DOCUMENTS

| | | |
|---|---|---|
| DE | 1 478 857 | 1/1970 |
| DE | 40 20 981 | 1/1992 |
| EP | 0 925 871 | 11/1998 |
| EP | 0 925 871 | 6/1999 |
| EP | 1 078 713 | 3/2000 |
| EP | 1 078 713 | 2/2001 |

(Continued)

*Primary Examiner* — Alvin Grant
(74) *Attorney, Agent, or Firm* — Jordan and Hamburg LLP

(57) ABSTRACT

A clamping device is capable of engaging a clamping object with an inner wall of hole or side wall of the clamping object. The clamping device 1 is provided with a rod support for moving an engagement portion 25 of a clamping rod 3 in a direction roughly rectangular to the longitudinal direction of the clamping rod 3 and switchably rotatably supports the clamping rod 3 in a clamping main body across a clamping position and a clamp release position, a piston drive mechanism 6 for driving a piston 4 across the clamping position and the clamp release position, and a cam mechanism 7 for driving the engagement portion 25 in the clamping direction by the driving force of piston drive mechanism 6 for driving the piston 4 to the clamping position.

13 Claims, 10 Drawing Sheets

FOREIGN PATENT DOCUMENTS

| | | |
|---|---|---|
| JP | 5-41644 | 6/1993 |
| JP | 6-42969 | 6/1994 |
| JP | 7-47268 | 5/1995 |
| JP | 2506354 | 5/1996 |
| JP | 11-188551 | 7/1999 |
| JP | 2602493 | 11/1999 |
| JP | 2002-89509 | 3/2002 |
| JP | 2002-96231 | 4/2002 |

* cited by examiner

CLAMPING DEVICE

TECHNICAL FIELD

The present invention relates to a clamping device which is releasably engaged to the inner wall or side wall of the cavity of a clamping object to fix the clamping object to a base.

BACKGROUND OF THE RELATED ART

Various types of clamping devices have been proposed and are practically used as clamping devices for fixing a workpiece (a clamping object) to a work fixing platform, such as a work pallet, etc.

For example, a clamping device that attracts and fixes a workpiece to a work fixing platform is disclosed in Ger. Laid-Open Patent Application DE-4020981-A1.

As shown in FIG. 19, in clamping device 200, a pull rod 202 is mounted to a clamping main body 201 so as to move freely vertically and protrude upward, and a tapered rod 202a, in which the horizontal cross-section becomes large toward upward, is formed at the upper end of the pull rod 202. A collet member 203 is externally fitted to the upper part of pull rod 202, and a collet 203a which is externally fitted to the tapered rod 202a and is elastically deformable to enlarge the diameter is provided in the collet member 203.

Moreover, an oil hydraulic cylinder 204 driving the pull rod 202 downward, a coil spring 205 energizing the pull rod 202 elastically upward and a plate spring 206 energizing the collet member 203 elastically upward are provided in clamping device 200.

The lower end of pull rod 202 is connected to a piston 204a of oil hydraulic cylinder 204, the piston 204a being elastically energized upward by the coil spring 205. The collet member 203 is supported from below by a collet supporting member 207, which is elastically energized upward by the plate spring 206.

When a workpiece W is fixed, if oil pressure is supplied to the oil hydraulic cylinder 204 in a state in which the tapered rod 202a and the collet 203a are inserted into a hole Wa formed in the workpiece W from below, the pull rod 202 is driven downward to lower the tapered rod 202a, at which time, the collet member 203 is elastically energized upward by the plate spring 206. Therefore the collet 203a is lowered only slightly, and is elastically deformed to the diameter enlargement side and engaged with the hole Wa, the workpiece W being attracted and fixed to a work receiving surface 201a of clamping main body 201.

In Japanese Laid-Open Patent Application H11-188551, the clamping device 200 and main constitution are basically the same, but a clamping device in which the pull rod is driven up/down by a reciprocating oil hydraulic cylinder is disclosed.

However, in the clamping device of the gazette, oil pressure must be continuously supplied to the oil hydraulic cylinder by oil pressure supply unit to fix a workpiece. Therefore, an oil pressure supply device must be provided in a work pallet to convey the workpiece with the work pallet in a state in which the workpiece is fixed to the work pallet by the clamping device. However, the conveying load of the work pallet increases if oil pressure supply unit is provided for each work pallet, and the equipment cost also rises.

The objects of the present invention are, in a clamping device, to fix simply and reliably a clamping object to a base, to simplify and miniaturize the structure to reduce manufacturing costs, to make it possible to fix a clamping object to a base by engaging to either the inner wall or the side wall of the hole of the clamping object, and to maintain the state of fixing the clamping object to the base without supplying oil pressure.

SUMMARY OF THE INVENTION

The clamping device of present invention is a clamping device for fixing a clamping object to a base by releasably engaging with an inner wall of a hole or side wall formed in the clamping object, wherein the clamping device is characterized by comprising: a clamping main body fixed to the base and is communicatingly formed with a rod insertion hole and a piston receiving cavity, a clamping rod which is inserted through the rod insertion hole of the clamping main body and protruding its top-end portion from the clamping main body, the top-end portion being provided with an engagement portion capable of engaging with the inner wall or side wall of the hole, a piston member movably mounted in the piston receiving cavity of the clamping main body, a rod support mechanism which moves the engagement portion of the clamping main body in a direction roughly rectangular to the longitudinal direction of the clamping rod and switchably supports the clamping rod in the clamping main body or the piston member across a clamping position and a clamp release position, a piston driving means for driving the piston member across the clamping position and the clamp release position, and a cam mechanism for driving the engagement portion of the clamping rod in a clamping direction roughly rectangular to the longitudinal direction of the clamping rod by a driving force of the piston driving means for driving the piston member to the clamping position (claim 1).

In the clamping device, the clamping main body is fixed to the base, the clamping rod is inserted through the rod insertion hole of clamping main body, and the top-end portion of the clamping rod protrudes from the clamping main body. The clamping rod is supported on the clamping main body or the piston member by the rod support mechanism, the engagement portion of the clamping rod moves in a direction roughly rectangular to the longitudinal direction of the clamping rod (the direction rectangular to the longitudinal direction of the clamping rod is properly called "rod rectangular direction" hereinafter), the clamping rod being switchable across the clamping position and the clamp release position. The piston member is movably mounted in the piston receiving cavity of the clamping main body, and is driven across the clamping position and the clamp release position by the piston driving means.

An elastic member (e.g., a spring) energizing the piston member to the clamping position or the clamp release position and a single acting type fluid hydraulic cylinder (e.g., oil hydraulic cylinder) capable of driving the piston member to the clamping position or the clamping release position may also be suitable for the piston driving means. A double acting type fluid hydraulic cylinder (e.g., oil hydraulic cylinder) capable of driving the piston to both of the clamping position and the clamp release position may also be suitable for the piston driving means.

When a clamping object is fixed to the base, first, the engagement portion of the clamping rod is inserted into a hole of the clamping object in a state in which the clamping rod is located at the clamp release position, and the clamping object is set to a state in which the engagement portion approaches the inner wall of the hole or the engagement portion approaches the side wall of the clamping object.

If the piston member is driven to the clamping position in this state by the piston driving means, the engagement portion of the clamping rod is driven to a direction roughly rectangular to the longitudinal direction of the clamping rod by the driving force of the piston driving means, by the cam mechanism. In other words, the clamping object can be fixed to the base by switching the clamping rod from the clamp release position to the clamping position and pressing the engagement portion to the inner wall or side wall to engage it with friction force.

If the piston member is driven to the clamp release position by the piston driving means, the clamping object can be released from the base by switching the clamping rod from the clamping position to the clamp release position and releasing the engagement portion from the inner wall or side wall.

Here, the driving force of the piston driving means is increazed by the cam mechanism and can be converted to a driving force for driving the engagement portion of the clamping rod in the clamping direction and can also miniaturize the piston driving means.

As described above, the clamping device drives the piston member by the piston driving means and drives the engagement portion of the clamping rod by the driving force of the piston driving means by the cam mechanism, thereby reliably engaging the engagement portion with the inner wall or side wall of the hole of the clamping object and fixing the clamping object to the base simply and reliably. Moreover, the clamping device has a relatively simple constitution including; a clamping main body, a clamping rod, a piston member, a rod support mechanism, a piston driving means and a cam mechanism and the number of parts can be decreased, therefore it can also be miniaturized to reduce the manufacturing costs.

Furthermore, the clamping object can be fixed to the base by engaging the engagement portion of the clamping rod with either the inner wall of the hole or side wall of the clamping object, therefore the clamping uses of the clamping device increase to make it excellent in flexibility.

Next, a preferred and practical forms of elements of the present invention are described.

[Clamping Rod]

An engagement portion of the clamping rod has multiple annular edges. A clamping object can be reliably fixed to a base by engaging the engagement portion of the clamping rod reliably with the inner wall or side wall.

[Rod Support Mechanism]

(1) A rod support mechanism rotatably supports the longitudinal midway portion of the clamping rod on a clamping main body. If a piston is driven across a clamping position and a clamp release position, the clamping rod is rotated without moving in its longitudinal direction to engage with or disengage from the inner wall or side wall.

(2) The rod support mechanism may also rotatably support the base end portion of the clamping rod on the piston member.

(3) The rod support mechanism slidably supports the base end portion of the clamping rod on the piston member in a direction rectangular to the longitudinal direction of the clamping rod. If the piston is driven in the longitudinal direction of the clamping rod, the clamping rod slides in the rod rectangular direction to engage with or disengage from the inner wall or side wall while moving with the piston member in its longitudinal direction.

(4) The rod support mechanism may also slidably support the longitudinal midway portion of the clamping rod on the clamping main body in the rod rectangular direction.

[Piston Driving Means]

(1) The piston driving means is provided with a spring which elastically energizes the piston member to the clamping position. The engagement portion of the clamping rod can be engaged with the inner wall or side wall to fix the clamping object to the base by the elastic energization force of the spring without supplying oil pressure to the clamping device. That is, the clamping object can be conveyed with the base in a state in which the clamping object is fixed to the base.

(2) In case of (1), the piston driving means has an oil hydraulic operating chamber which drives the piston member to the clamp release position. Oil pressure is supplied to the oil hydraulic operating chamber, the piston member is driven against the energizing force of the spring, and the engagement portion of the clamping rod becomes movable in the clamping release direction.

(3) The piston driving means may also have an oil hydraulic operating chamber that drives the piston member to the clamping position.

(4) In case of the (3), the piston driving means may also have a spring which elastically energizes the piston member to the clamping release position.

(5) In case of the (3), the piston driving means may also have an oil hydraulic operating chamber which drives the piston member to the clamping release position.

[Cam Mechanism]

(1) A cam mechanism is provided with a sphere or a roller rotatably mounted in the base end portion of clamping rod and an inclined portion formed in the piston member so that the sphere or roller comes into contact therewith. In this case, it is preferable to apply rod support mechanism as the case of (1) or (4). The driving force of the piston driving means is increased and can be reliably converted to a driving force which drives the engagement portion of the clamping rod in the clamping direction, thus the engagement portion can be smoothly driven in the clamping direction and reliably engaged with the inner wall or side wall.

(2) A cam mechanism is provided with a sphere or a roller rotatably mounted to the inner wall of a rod insertion hole of clamping main body and an inclined portion formed in the piston member so that the sphere or roller comes into touch therewith. In this case, it is preferable to apply the rod support mechanism as the case of (2) or (3). The driving force of the piston driving means is increased and can be reliably converted to a driving force which drives the engagement portion of the clamping rod in the clamping direction, thus the engagement portion can be driven smoothly in the clamping direction and reliably engaged with the inner wall or side wall.

[Rod Return Mechanism]

When the piston member is moved to the clamp release position, a rod return mechanism which returns the clamping rod to the clamp release position is provided. The piston member is driven to the clamp release position by the piston driving means, reliably returning the clamping rod to the clamp release position by the rod return mechanism.

(1) When the rod support mechanism is cinstituted so that the longitudinal midway portion of the clamping rod is rotatably supported on the clamping main body, the rod return mechanism may also have a guided portion which is provided in the clamping rod and a guide which is provided in the piston member, which guides the guided portion and switches the clamping rod to the clamp release position, enabling reliably switching the clamping rod to the clamp release position by interlocking the piston member for moving it to the clamp release position.

(2) When the rod support is constituted so that the longitudinal midway portion of the clamping rod is rotatably supported on the clamping main body, the rod return mechanism may also have a guided portion which is provided in the clamping rod and a guide which is provided in the clamping main body, which guides the guided portion and switches the clamping rod to the clamp release position, with the same effect as with (1).

[Annular Sealing Member]

An annular sealing member for sealing a space between the clamping main body and the clamping rod is provided in the top portion of the rod insertion hole in the clamping main body, preventing cuttings of the clamping object, garbage or dust from entering the rod insertion hole.

[Air Blowing Means]

An air blowing means is provided which jets air to the top side of the rod insertion hole through an air passage between the clamping main body and the clamping rod. Air is jetted to the cuttings of the clamping object, garbage or dust adhering to the inner wall of the cavity or side wall of a clamping object to remove them, preventing cuttings of the clamping object, garbage or dust from entering the rod insertion hole and adhering the engagement portion to and engaging it reliably with the inner wall or side wall.

Another clamping device of present invention is comprising a clamping rod which is provided vertically in the base or the clamping main body connected with the base and a clamping rod driving means which moves the clamping rod to the base and is capable of holding it in position after movement. At least part of the clamping rod is brought into contact with the inner wall or side wall of an open space provided in the clamping object.

In this clamping device, a piston member, rod support mechanism, piston driving means and cam mechanism can be adopted as a clamping rod driving means. In addition, it can have a constitution comprising one or plural of members and mechanisms, such as a clamping spring, gear mechanism, external operating means, ratchet mechanism, etc.

Here, in above clamping device, it is preferable that the clamping rod be provided with a rod support mechanism which switchably supports the clamping rod on the base or the clamping main body across a clamping position in contact with the inner wall or side wall and a clamp release position separate from the inner wall or side wall.

It is preferable that the clamping rod driving means have an actuator which enables moving the clamping rod to the clamp release position or the clamping position and an energizing means which energizes the clamping rod to the clamping position or the clamping release position.

A boosting mechanism for boosting an energizing force by the energizing means and generating a clamping force for clamping a clamping object by the clamping rod may also be provided in the base or the clamping main body.

The clamping method of present invention is a clamping method for fixing a clamping object to a base, by means of utilizing plural holes provided in the clamping object, one or more guide rods movably provided in a base corresponding to one or more holes among the plural holes, and plural clamp rods provided movably; wherein the guide rods are inserted into the holes of the clamping object and the clamping rods are inserted into other holes of the clamping object, and then the clamping rods are driven by an actuator in a direction roughly rectangular to its longitudinal direction, each of the top-end portions of clamping rods is engaged with an inner wall of the hole, and the clamping object is aligned with the guide rods and fixed to the base.

This clamping method has the following advantages.

A clamping object can be reliably aligned with and fixed to the base, and the clamping object is not clamped by pressing it down from above, therefore distortion of the clamping object due to clamping becomes very small, enabling the application of very high-accuracy surface processing to the clamping object.

The clamping object is fixed to the base by inserting the clamping rod into the holes of the clamping object. Therefore the clamping rod, etc. do not protrude to the surface of the clamping object, enabling application of processing to nearly the entire surface of the clamping object; and working without the interference of the tools of a processor with the clamping rod, etc.

The processing tools do not interfere with the clamping rod, eliminating excessive movement of the tools to avoid interference and shortening the processing time, such as the air cut time of the work. This also enables fixing a clamping object of almost the same size as the area of the base.

BRIEF DESCRIPTION OF THE DRAWINGS

FIG. 1~FIG. 5 are drawings relating to Embodiment 1, wherein

FIG. 1 is a plane view of a clamping device,

FIG. 2 is a vertically sectional view of the clamping device (clamp released state), FIG. 3 is a III-III line sectional view of FIG. 2, and FIG. 4 and FIG. 5 are vertically sectional views of the clamping device (clamped state).

FIG. 7~FIG. 9 are drawings relating to Embodiment 2, wherein

FIG. 7 is a vertically sectional view of the clamping device (clamped state),

FIG. 8 is a vertically sectional view of the clamping device (clamped state), and FIG. 9 is a vertically sectional view of the clamping device (protruded state).

FIG. 16~FIG. 18 are drawings relating to Embodiment 4, wherein

FIG. 16 is a plane view of the clamping device,

FIG. 17 is a side view of the clamping device, and

FIG. 18 is a plane view of essential parts of the clamping device.

DETAILED DESCRIPTION OF THE PREFERRED EMBODIMENTS

Figure 7:
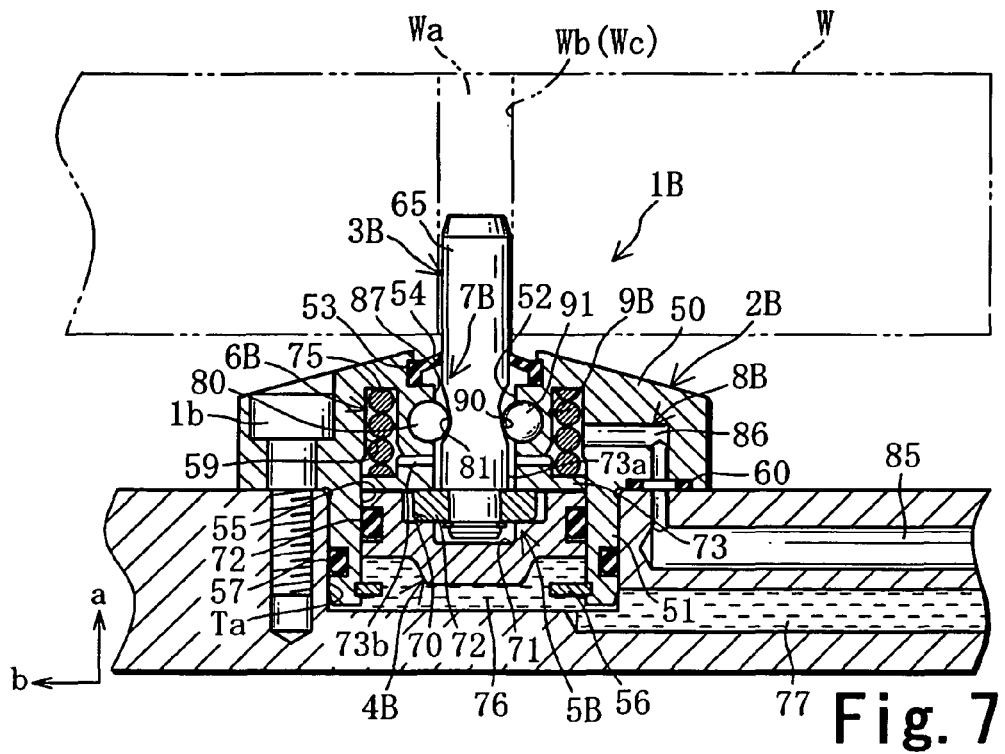

The best embodiment of the present invention is described hereafter, with reference to the drawings. This embodiment is one example of applying the present invention to a clamping device for fixing a workpiece (clamping object) to a work fixing platform (base) when it is to be machined. Arrows "a" and "b" in FIGS. 2 and 7 shows upward direction and leftward direction, respectively.

[1] Embodiment 1 (see FIG. 1~FIG. 5)

Figure 1:
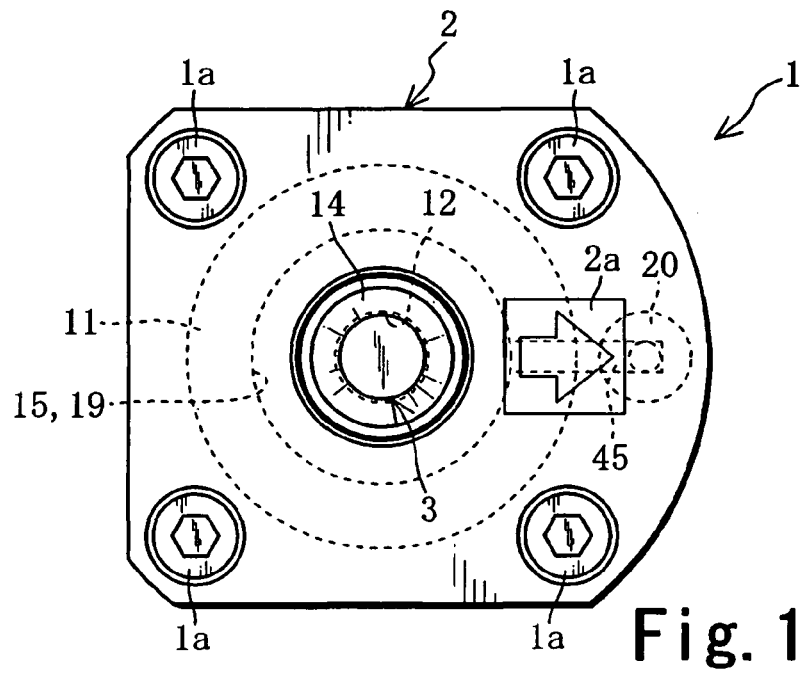
Figure 2:
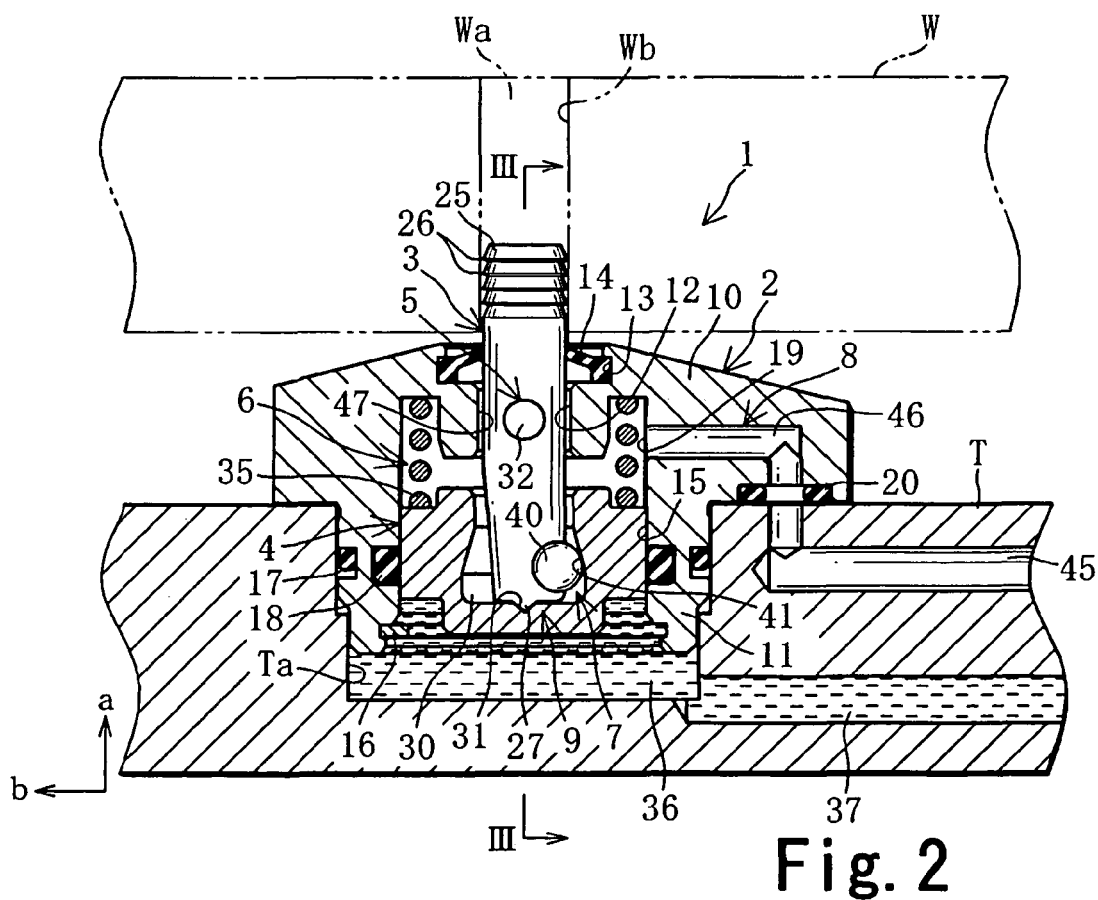
Figure 3:
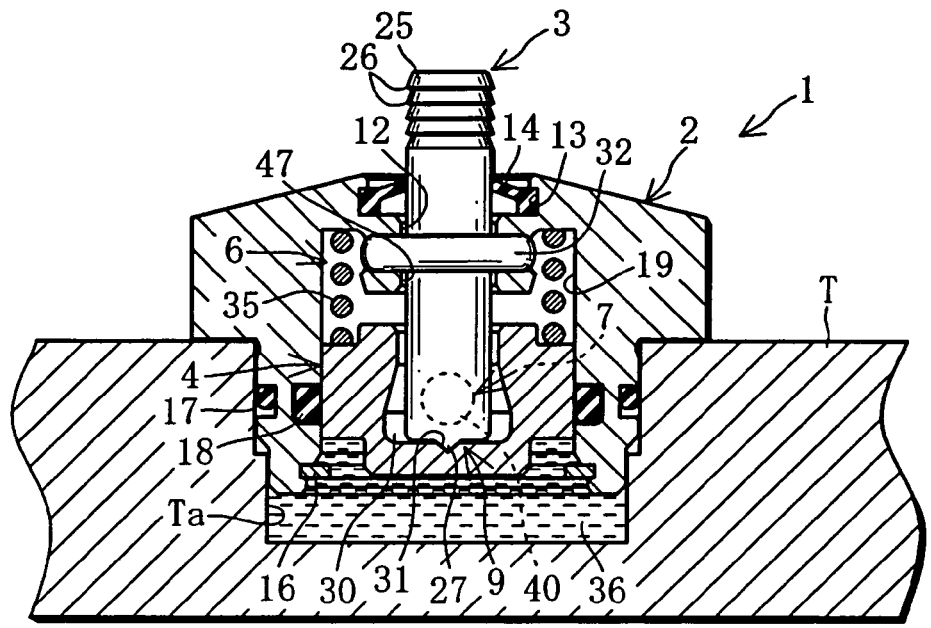
Figure 4:
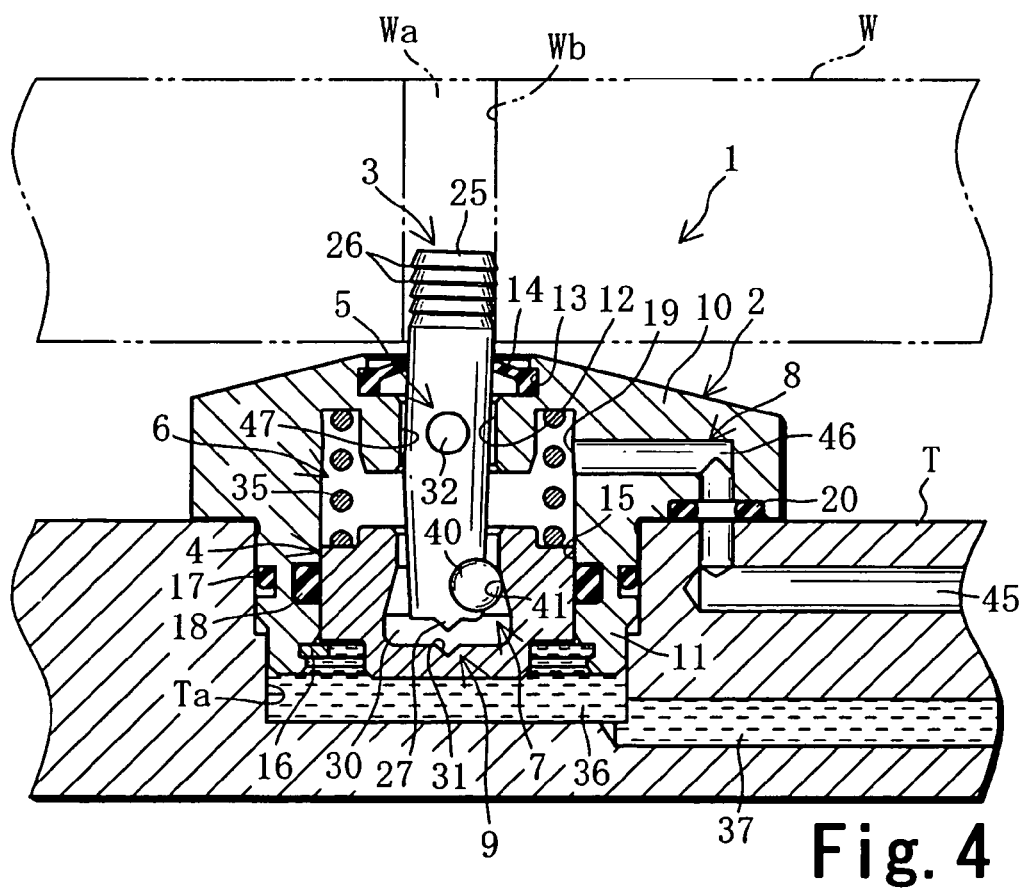

As shown in FIG. 2, FIG. 4, a vertical hole Wa is formed in a workpiece supplied for machining in a penetrating way. This hole Wa is formed so that its diameter is slightly larger than the diameter (e.g., 6.5 mm) of the top-end portion (upper end) of a clamping rod 3 of a clamping device 1. Moreover, a non-penetrating hole may also be formed from the lower side in a workpiece W as hole Wa.

One or plural holes are formed in the workpiece W, one or plural clamping devices 1 mounted to a work fixing platform T are releasably engaged with the inner wall Wb of the one or plural holes Wa, or one or plural clamping devices 1 mounted on a work fixing platform T are releasably engaged with the side wall Wc of workpiece W, the workpiece W is fixed to the work fixing platform T, in which state the top surface of workpiece W is machined by a working machine.

Next, descriptions on the clamping device 1 will be made.

As shown in FIG. 1~FIG. 5, the clamping device 1 is provided with; a clamping main body 2 mounted on the work fixing platform T and formed with a rod insertion hole 12, and a piston receiving cavity 15 which are communicatingly formed, a clamping rod 3 inserted through the rod insertion hole 12 and having a top-end portion protruding from the clamping main body 2, and an engagement portion 25 capable of engaging with the inner wall Wb or side wall Wc, a piston member 4 movably mounted in the piston receiving cavity 15 of clamping main body 2, a rod support member 5 which moves the engagement portion 25 of the clamping rod 3 in a direction (roughly lateral direction) roughly rectangular to the longitudinal direction (vertical direction) and switchably supports the clamping rod 3 in the clamping main body 2 across a clamping position and a clamp release position, a piston drive mechanism 6 which drives the piston 4 across a clamping position and a clamp release position in the vertical direction, a cam mechanism 7 which drives the engagement portion 25 of the clamping rod 3 in the clamping direction (roughly to the right) by the driving force of the piston drive mechanism 6 which drives the piston 4 to the clamping position, an air blowing mechanism 8 which jets air to the top of the rod insertion hole 12 through an air passage 47 between the clamping main body 2 and the clamping rod 3, and a rod return mechanism 9 which returns the clamping rod 3 to the clamping release position when the piston 4 is moved to the clamp release position.

The clamping main body 2 is provided with a head 10 and a cylinder 11 extending from the head 10 to the lower side. A clamp mounting cavity Ta is formed in the work fixing platform T, and the cylinder 11 is internally fitted to the clamp mounting cavity Ta, the head 10 being brought into contact with the top surface of work fixing platform T, in which state the head 10 is fastened to the work fixing platform T with four bolts 1a.

The rod insertion hole 12 is formed in the head 10, a seal mounting cavity 13 is formed in the upper end portion of the rod insertion hole 12, and an annular sealing member 14 for sealing a space between the clamping main body 2 and the clamping rod 3 is mounted in the seal mounting cavity 13. The piston receiving cavity 15 having a diameter greater than the rod insertion hole 12 is formed in the cylinder 11, and a stop ring 16 consisting of a C ring for restricting the downward movement of piston 4 is mounted to the inner surface of the lower end of cylinder 11. A sealing member 17 for sealing the space between the cylinder 11 and the work fixing platform T and a sealing member 18 for sealing the space between the cylinder 11 and the piston 4 are mounted in the cylinder 11.

A spring mounting cavity 19 communicating with the upper side of piston receiving cavity 15 is formed in the head 10, and a spring 35 (energizing means) which elastically energizes the piston 4 to the lower clamping position is mounted in the spring mounting cavity 19.

An air passage 46 of air blowing mechanism 8 is formed in the head 10, and extends from the downside of right end of head 10 to the spring mounting cavity 19. The upstream end of the air passage 46 is connected to an air passage 45 formed in the work fixing platform T, and a sealing member 20 for sealing the space between the head 10 and the work fixing platform T is mounted in the head 10.

The upper end portion of the clamping rod 3 protrudes upward of clamping main body 2, the longitudinal midway portion (longitudinal central portion) is inserted through the rod insertion hole 12, and its lower end is received at the inner side of piston 4, and the clamping rod 3 is disposed verticall in the work fixing platform T and clamping main body 2. The engagement portion 25 (upper end portion) of the clamping rod 3 has plural annular edges 26, which are integrally formed with the clamping rod 3. A sphere 40 of cam mechanism 7 is rotatably mounted at the right portion of lower end of the clamping rod 3, and a downwardly protruding guided portion 27 is formed at the lower end face of the clamping rod 3.

The piston 4 has a vertical length approximately the same as that of cylinder 11 of clamping main body 2. A recess 30 with an open upper side and a circular horizontal cross-section is formed in the piston 4, with the lower end portion of the clamping rod 3 and the sphere 40 being arranged in the recess 30. A guide 31 which guides the guided portion 27 of the clamping rod 3 and comprises a recess releasably engaged with the guided portion 27 is formed at the bottom of recess 30.

When the lower-end face of the clamping rod 3 makes contact with the bottom of recess 30 and the guided portion 27 engages with the guide 31, the upward movement of piston 4 is controlled, with the piston 4 being located at the clamp release position. At this time, the clamping rod 3 assumes a perpendicular posture to become the clamp release position, and the axis of the clamping rod 3 and the axis of the rod insertion hole 12 are coincidental (see FIG. 2). On the other hand, in a state in which the piston 4 is brought into contact with the stop ring 16 from the above, the downward movement of piston 4 is restricted and the piston 4 becomes located at the lower limit position, at which time the clamping rod 3 assumes an inclined posture in which it is inclined a few degrees (e.g., 2.2°) from the perpendicular posture to the right side.

The rod support mechanism 5 rotatably supports the longitudinal midway portion of the clamping rod 3 in the clamping main body 2. In a specific constitution, a spindle 32 disposed horizontally from front to back penetrates the longitudinal central portion of the clamping rod 3, both ends of the spindle 32 are supported by a cylindrical wall forming the rod insertion hole 12 of clamping main body 2, with the clamping rod 3 being rotatably supported in the clamping main body 2 via the spindle 32.

The piston drive mechanism 6 is provided with a spring 35 made of a compression coil spring which elastically energizes the piston 4 to the lower clamping position and has an oil hydraulic operating chamber 36 which drives the piston 4 to the upper clamp release position relative to the clamping main body 2.

The oil hydraulic operating chamber 36 below the piston 4 is formed in a portion enclosed by the clamping main body 2, piston 4 and work fixing platform T. An oil hydraulic passage 37 connected to the oil hydraulic operating chamber 36 is formed in the work fixing platform T, and an oil hydraulic supply unit (not shown) is detachably connected to the oil hydraulic passage 37.

If oil pressure is supplied to the oil hydraulic operating chamber 36 via the oil hydraulic passage 37 by the oil hydraulic supply unit from the state shown in FIG. 4, the piston 4 is driven upward against the elastic energizing force of the spring 35 and assumes the clamp release position (see FIG. 2); if oil pressure is discharged from the oil hydraulic operating chamber 36 from the state shown in FIG. 2, the piston 4 energized elastically by the spring 35 moves downward.

The cam mechanism is provided with a sphere 40 rotatably mounted at the lower end of the clamping rod 3 and an inclined portion 41 formed in the piston 4 so as to make contact with the sphere 40. The inclined portion 41 is formed at the wall of the recess 30 whose horizontal cross-section becomes small toward upward, which is formed in the piston 4.

If the piston 4 is driven downward by the spring 35, the sphere 40 is pressed to the left by the inclined portion 41, a moment clockwise in a front view operates on the clamping rod 3 rotatably supported by the rod support mechanism 5, and the engagement portion 25 of the clamping rod 3 is driven in the clamping direction.

Here, the driving force of spring 35 driving the piston 4 downward is boosted by several times by the cam mechanism 7 and transmitted to the lower end of the clamping rod 3. The distance between the engagement portion 25 of the clamping rod 3 and the rotation center and the distance between the lower end of the clamping rod 3 and the rotation center are about the same. Therefore the engagement portion 25 is driven in the clamping direction by the force boosted and transmitted to the clamping rod 3. Namely, the cam mechanism 7 is a force boosting mechanism which boosts the energization force due to the spring 35 to generate a clamping force for clamping the workpiece W by the clamping rod 3. Moreover, a direction display 2a, such as a seal showing the clamping direction of engagement portion 25 of the clamping rod 3, is provided at the top of clamping main body 2.

The air blowing mechanism 8 is provided with an air passage 45 formed in the work fixing platform T, the air passage 46 formed in the clamping main body 2 and the air passage 47 formed in the space between the clamping main body 2 and the clamping rod 3. If an air supply unit is connected to the air passage 45 and a pressurized air is supplied to the air passage 45 from the air supply unit, the air is jetted to the upper end of the rod insertion hole 12 through the air passages 45, 46, spring mounting cavity 19 and air passage 47.

The rod return mechanism 9 is provided with a downwardly protruding guided portion 27 provided at the lower end of the clamping rod 3 and the guide 31 made of a recess provided at the bottom of recess 30 of piston 4, guides the guided portion 27 and switches the clamping rod 3 to the clamp release position.

Actions and advantages of the clamping device 1 will be described next.

In a state in which the oil pressure is not supplied to the oil hydraulic operating chamber 36, the piston 4 energized elastically downward by the spring 35 is located at the lower limit position, and the clamping rod 3 assumes an inclined posture where it is inclined by a few degrees (e.g., 2.2°) from the perpendicular posture to the right side.

When the workpiece W is fixed to the work fixing platform T, first, oil pressure is supplied to the oil hydraulic operating chamber 36 of piston drive mechanism 6, and the piston 4 is driven upward against the force of spring 35. When the piston 4 moves upward, the clamping rod 3 becomes rotatable counter-clockwise in the front view. Finally, the guided portion 27 provided in the clamping rod 3 is guided by the guide 31 provided in the piston 4 and the clamping rod 3 returns to the clamp release position while the clamping rod 3 is rotated to the perpendicular side (counter-clockwise in the front view) by an elastic force due to the annular sealing member 14.

When the piston 4 is driven upward and reaches the clamp release position, the axial center of the clamping rod 3 and the axial center of the rod insertion hole 12 are coincident, the clamping rod 3 becomes perpendicular, and in the clamp release position, the guided portion 27 of the clamping rod 3 is engaged with the guide 31 of piston 4, and the clamping rod 3 is non-rotatably held. When in this state the workpiece W is fixed to the work fixing platform T by the inner wall Wb of the hole Wa of workpiece W, as shown in FIG. 2, the engagement portion 25 of the clamping rod 3 is inserted into the hole Wa, and the workpiece W becomes a state in which the engagement portion 25 approaches the inner wall Wb.

Next, if the oil pressure is relieved from the oil hydraulic operating chamber 36, the piston 4 is driven downward by the spring 35. When the piston 4 is slightly driven downward from the clamp release position, the guided portion 27 is disengaged from the guide 31. Then, when the piston 4 is driven downward by the spring 35, the driving force of spring 35 is boosted and transmitted to the lower end of the clamping rod 3, and the clamping rod 3 is driven to rotate clockwise in the front view. Thus, as shown in FIG. 4, the engagement portion 25 of the clamping rod 3 is driven to the clamping position by the driving force of spring 35, the engagement portion 25 is pressed and closely adheres to the inner wall Wb and becomes engaged therewith, and the workpiece W can be fixed to the work fixing platform T.

When the workpiece W is released from the work fixing platform T, oil pressure is supplied to the oil hydraulic operating chamber 36, and as described above, the piston 4 is driven to the upper clamp release position, the clamping rod 3 is rotated to become perpendicular, the engagement portion 25 is moved in the clamping release direction, thus the workpiece W can be released from the work fixing platform T.

Figure 5:
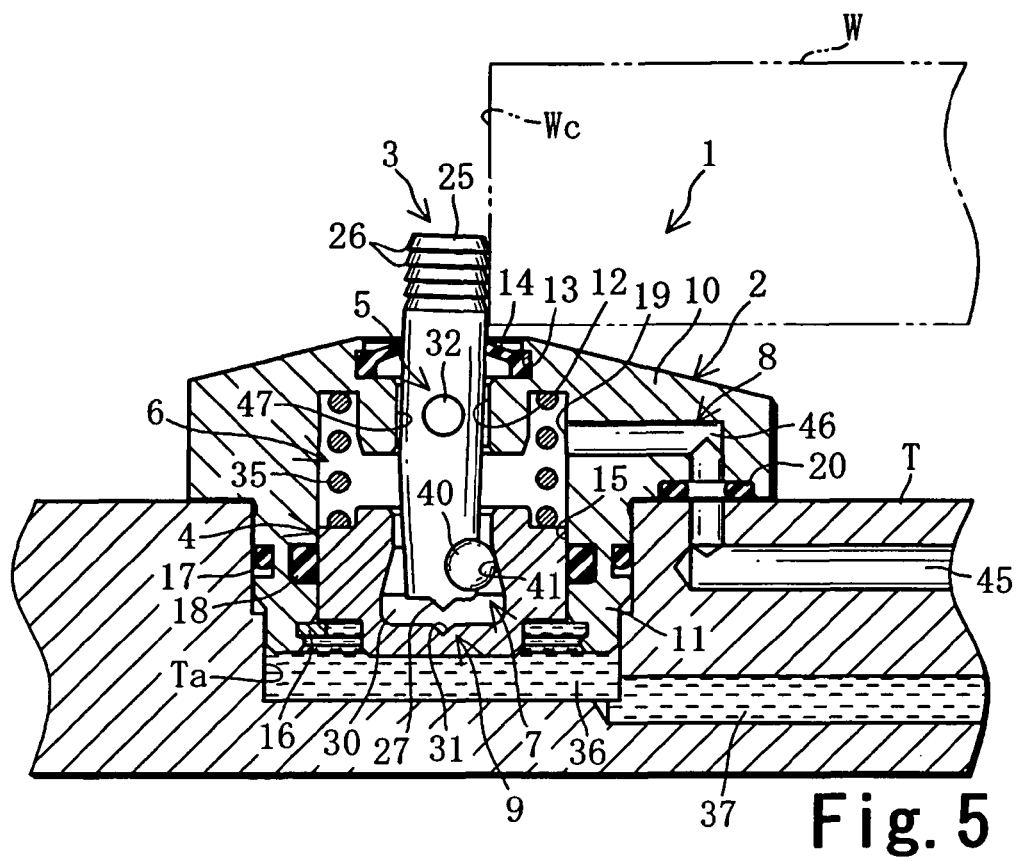

When the workpiece W is fixed to the work fixing platform T by the side wall Wc of workpiece W, as shown in FIG. 5, the workpiece becomes a state in which the engagement portion 25 approaches the side wall Wc from the left, in which the clamping rod 3 is made perpendicular. Subsequently, the oil pressure is relieved from the oil hydraulic operating chamber 36 as described above, and when the oil pressure is relieved from the oil hydraulic operating chamber 36. When the workpiece W is released from the work fixing platform T, oil pressure is supplied to the oil hydraulic operating chamber 36.

As described above, this clamping device 1 enables reliably engaging with engagement portion 25 of clamping rod 3 with the inner wall Wb or side wall Wc of workpiece W and fixes the workpiece W to the work fixing platform T simply and reliably by driving the piston 4 downward by the piston drive mechanism 6 and by driving the engagement portion 25 of the clamping rod 3 in the clamping direction with the driving force of piston drive mechanism 6 by the cam mechanism 7.

It is unnecessary to continuously supply oil pressure to the oil hydraulic cylinder from the oil supply unit, therefore the workpiece W can be conveyed with the work fixing platform T in a state in which the workpiece W is fixed to the work fixing platform T. Namely, clamping device 1 enables reducing the conveying load of work fixing platform T and workpiece W and also reduces equipment costs because an oil supply unit is not provided for each work fixing platform T.

Moreover, the clamping device 1 enables miniaturization and reduced manufacturing costs because it has a simpler structure having a clamping main body 2, clamping rod 3, piston 4, rod support mechanism 5, piston drive mechanism 6, cam mechanism 7, air blowing mechanism 8 and rod returning mechanism 9 and also decreases the number of parts.

Furthermore, clamping uses of the clamping device 1 are increased with excellent flexibility because the engagement portion 25 of the clamping rod 3 is engaged with either inner wall Wb or side wall Wc of workpiece W and the workpiece W can be fixed to the work fixing platform T.

The cam mechanism 7 enables energizing the driving force of spring 35, reliably converting it to the driving force for driving the engagement portion 25 of the clamping rod 3, reliably engaging with the inner wall Wb or side wall Wc because the cam mechanism 7 has the sphere 40 rotatably mounted at the lower end portion of the clamping rod 3 and making contact with the inclined portion 41 formed in the piston 4. The engagement portion 25 can be reliably engaged with the inner wall Wb or side wall Wc by the cam mechanism 7 comprising the boosting mechanism, even if the spring 35 becomes slightly weak.

When the piston 4 is moved to the clamp release position, a rod return mechanism 9 for returning the clamping rod 3 to the clamp release position is provided, reliably returning the clamping rod 3 to the clamp release position by the rod returning mechanism 9 by driving the piston 4 to the clamp release position.

This rod return mechanism 9 has a guided portion 27 provided in the clamping rod 3 and the guide 31 provided in the piston 4, guides the guided portion 27 and switches the clamping rod 3 to the clamp release position, reliably switching the clamping rod 3 to the clamp release position by interlocking the piston 4 for moving it to the clamp release position.

The engagement portion 25 of the clamping rod 3 has plural annular edges 26, enabling the workpiece W to be reliably fixed to the work fixing platform T by reliably engaging the engagement portion 25 with the inner wall Wb or side wall Wc of workpiece W.

The annular sealing member 14 for sealing a space between the clamping main body 2 and the clamping rod 3 is mounted in the top of the rod insertion hole 12 in the clamping main body 2, preventing the cuttings, garbage and dust from entering the rod insertion hole 12. Moreover, the return of the clamping rod 3 to the perpendicular posture can be assisted by the annular sealing member 14, and the clamping device 1 can be reliably operated and the structure can be further simplified by providing an annular sealing member 14 having both of these functions.

Air blowing mechanism 8 for jetting air to the upper end of the rod insertion hole 12 through the air passage 47 between the clamping main body 2 and the clamping rod 3 is provided so that, when the workpiece W is fixed to the work fixing platform T, the air is jetted to the cuttings, garbage and dust adhering to the inner wall Wb or side wall Wc to remove them and prevent them from entering the rod insertion hole 12, thus the engagement portion 25 can reliably adhere to and engage with the inner wall Wb or side wall Wc.

Heretofore, when a workpiece was exchanged by a robot and conveyed in an automatic workpiece conveyer line, handling jigs for work clamping had to be prepared conforming to the shape of the workpiece and there were many inconvenient aspects. However, if one or more holes exist in a workpiece or if it is hollow, the hanling jigs can be easily made common by applying the clamping device 1 of present invention even though the shape of workpiece may change.

Moreover, a self-locking action operates during clamping, for example, when cutting the workpiece W, even if a clamping release forces acts on the clamping rod 3, the clamping rod 3 never move to the clamp release position and is not released from clamping.

Figure 6:
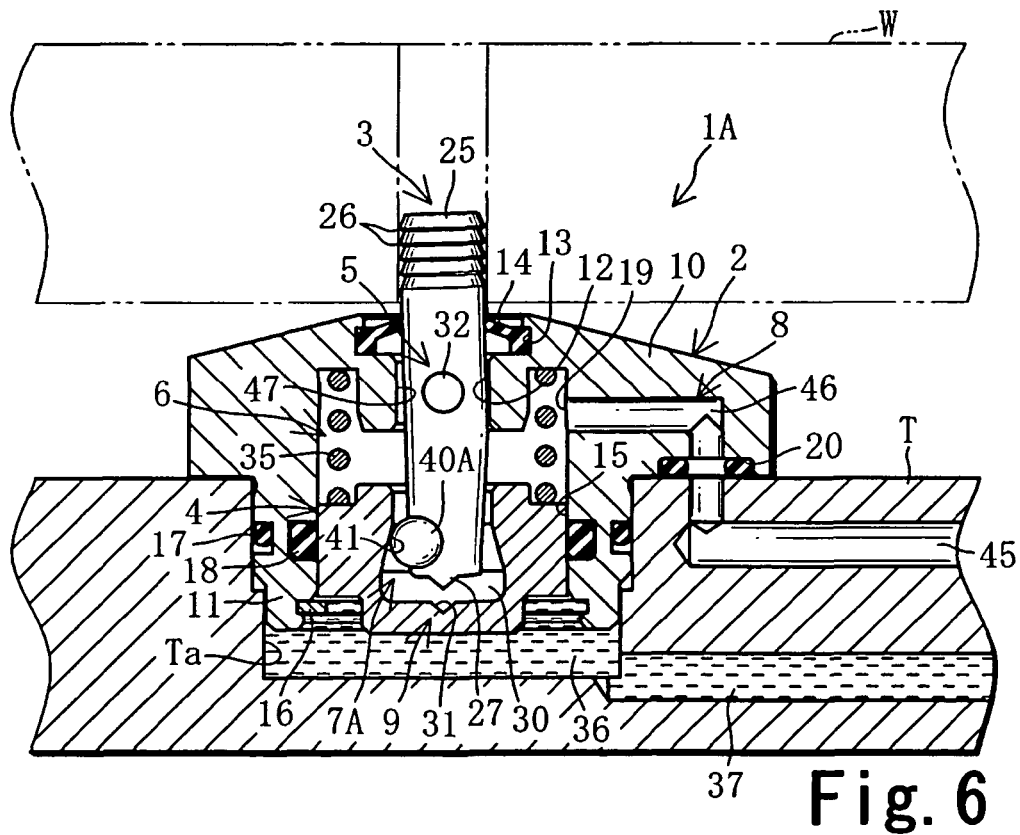
FIG. 6 is a vertical sectionally view of a clamping device relating to a modification of Embodiment 1.

The clamping device 1 of Embodiment 1 can be modified as with the clamping device 1A of FIG. 6. The clamping device 1A is provided with a cam mechanism 7A having a sphere 40A on a side opposite the cam mechanism 7 relative to the axial center of the rod insertion hole 12. Therefore, if the piston is driven downward to the clamping position by the spring 35, the engagement portion 25 of the clamping rod 3 is driven roughly to the left (clamping direction) by the driving force of spring 35 by the cam mechanism 7A. The other basic constitution of this clamping device 1A is the same as the clamping device 1.

In the cam mechanism 7, 7A, an inclined portion 41 may also be formed in a tapered groove having a bottom with an arc-like cross-section where the sphere 40 is engaged in the form of linear contact. A roller horizontal from front to back may also be rotatably mounted on the clamping rod 3 in place of the sphere 40 or 40A. In this case, the inclined portion 41 is formed into a smooth inclined surface in which the roller is able to contact.

Figure 8:
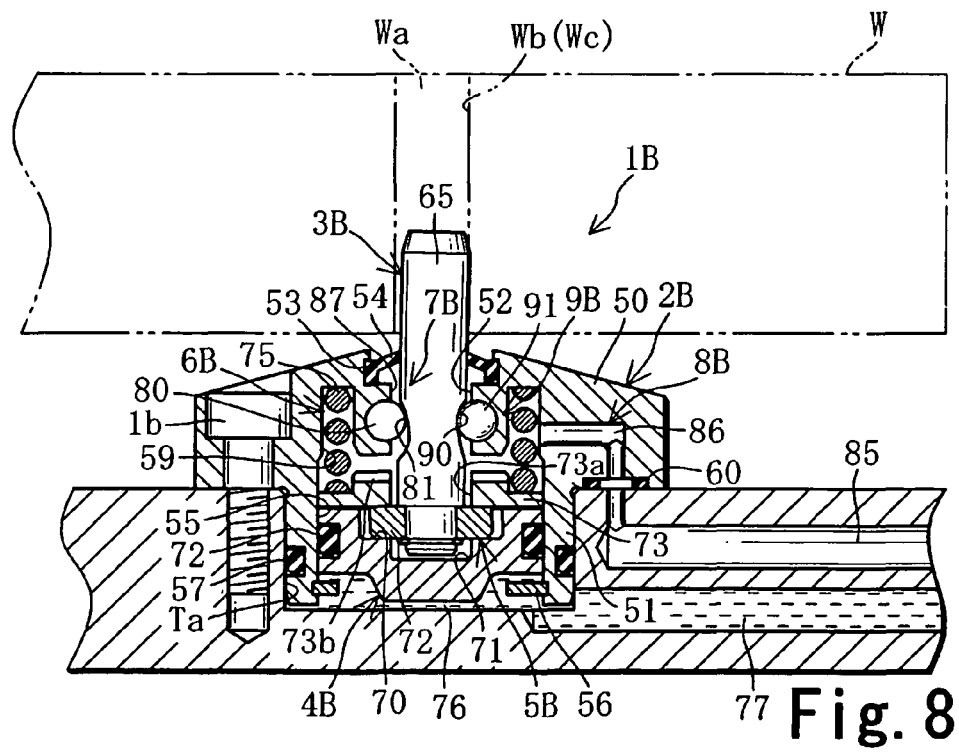
Figure 9:
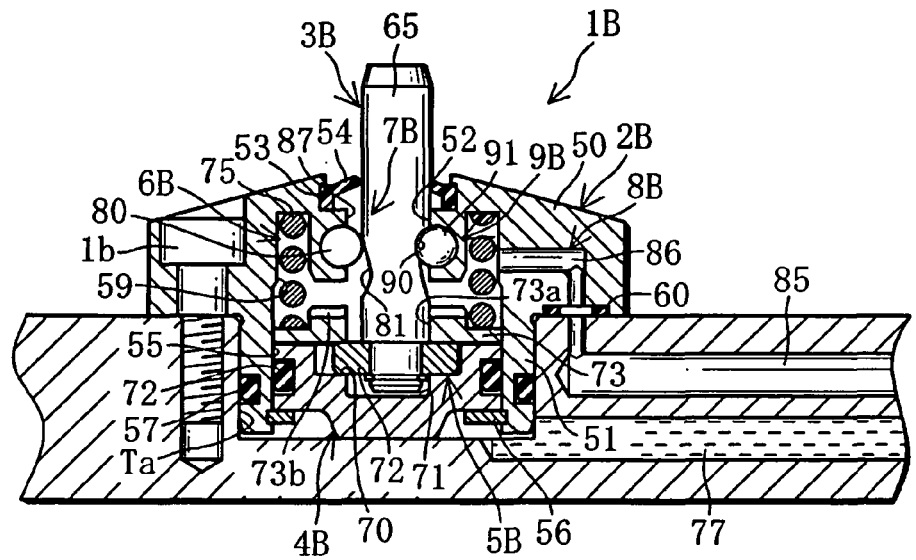

[2] Embodiment 2 (see FIG. 7~FIG. 9)

As shown in FIG. 7~FIG. 9, a clamping device 1B is provided with a clamping main body 2B, a clamping rod 3B, a piston 4B, a rod support mechanism 5B, a piston drive mechanism 6B, a cam mechanism 7B, an air blowing mechanism 8B and a rod return mechanism 9B. These members and basic constitution and functions of mechanisms 2B~9B are same as those of the members and mechanisms 2~9 of the clamping device 1 of Embodiment 1. Thus, these members and mechanisms 2~9 are briefly described below.

The clamping main body 2B is provided with a head 50 and a cylinder 51, the cylinder 51 is internally fitted to a clamp mounting cavity Ta of work fixing platform T, and the head 50 is fastened to the work fixing platform T with four bolts 1b. A rod insertion hole 52, a seal mounting cavity 53, a spring mounting cavity 59 and an air passage 86 are formed in the head 50. An annular sealing member 54 is mounted in the seal mounting cavity 53, a spring 75 (energizing means) is mounted in the spring mounting cavity 59, a roller 80 of cam mechanism 7B which is disposed horizontally from front to back is rotatably mounted to the left inner wall of the rod insertion hole 52 of head 50, a sphere 91 as guide of rod return mechanism 9B is mounted rotatably to the right inner wall of the rod insertion hole 12 of head 50, and a sealing member 60 is also mounted to the head 50. A piston receiving cavity 55 is formed in the cylinder 51, a stop ring 56 and a sealing member 57 are also mounted to the cylinder 51.

The clamping rod 3B is such that an engagement portion 65 of the upper end portion protrudes upward of clamping main body 2B, the longitudinal midway portion is inserted through the rod insertion hole 52, and the lower end is received on the inner side of piston 4B, and the clamping rod 3B is vertically provided in the work fixing platform T and the clamping main body 2B. An inclined portion 81 of cam mechanism 7B is formed in the left part of the clamping rod 3B where the rod 3B is inserting through the rod insertion hole 52, and a taper 90 as the guided portion of rod holding mechanism 9B is formed in the right of the same portion of the clamping rod 3B. Engagement portion 65 may also have plural annular edges like engagement portion 25.

A first recess 70 is formed in the piston 4B, and a second recess 71 concave downward is formed from the first recess 70. A sliding member 72 of rod support mechanism 5B is mounted in the first recess 70, and the lower end of the clamping rod 3B fixed to the sliding member 72 faces the second recess 71. A sealing member 72 for sealing a space between the piston 4B and the cylinder 51 is mounted in piston 4B.

An upper wall member 73 is provided upward of piston 4B, the upward movement of piston 4B is restricted and the piston 4B is located at the clamp release position in a state in which the upper wall member 73 is brought into contact from below with an annular wall forming the rod insertion hole 52 of clamping main body 50.

The rod support mechanism 5B slidably supports the base end portion (lower end portion) of the clamping rod 3B on the piston 4B in the lateral direction rectangular to the longitudinal direction of the clamping rod 3B. In a specific constitution, a small-diameter part in the lower end of the clamping rod 3B is inserted through and fixed to the sliding member 72, the sliding member 72 being mounted to the first recess 70, the upper wall member 73 being fixed to top face of piston 4B, and the sliding member 72 being slidably supported in the lateral direction. An insertion cavity 73a is formed in the upper wall member 73, with clamping rod 3B being inserted through the insertion cavity 73a. Insertion cavity 73a is formed in a diameter allowing the lateral movement of the clamping rod 3B.

The piston drive mechanism 6B is provided with a spring 75 made of a compression coil spring which elastically energizes the piston 4B to the lower clamping position relative to the clamping main body 2B, and an oil hydraulic operating chamber 76 which drives the piston 4B to the upper clamp release position. An oil hydraulic passage 77 connected to the oil hydraulic operating chamber 76 is formed in the work fixing platform T.

Cam mechanism 7B is provided with a roller 80 rotatably mounted on the left inner wall of the rod insertion hole 52 of clamping main body 2B and an inclined portion 81 formed in the clamping rod 3B so that the roller 80 is in contact therewith. The inclined portion 81 is formed into an inclined notch so that the more it is to the lower side, the nearer to the central side it will be.

If the piston 4B is driven downward by the spring 75, the clamping rod 3B moves downward integrally with the piston 4B, at which time, the inclined portion 81 is pressed to the right, and the engagement portion 65 is driven in the clamping direction (to the right). Here, the driving force of spring 75 which drives the piston 4B downward is boosted by several times and transmitted to the clamping rod 3B. In other words, the cam mechanism 7B is a boosting mechanism which boosts the energizing force due to the spring 75 to generate a clamping force for clamping the workpiece W by the clamping rod 3B.

The air blowing mechanism 8B has an air passage 86 formed in the clamping main body 2B, plural grooves 73b formed radially on the top surface of upper wall member 73 and an air passage 87 formed between the clamping main body 2B and the clamping rod 3B in the rod insertion hole 52. If pressurized air is supplied to the air passage 85 from an air supply unit, the air is jetted to the upper end side of the rod insertion hole 52 through the air passages 85, 86, spring mounting cavity 59 and air passage 86, and is also jetted to the upper end side of the rod insertion hole 52 for the air to pass through the groove 73b of upper wall member 73 in a state in which the upper wall member 73 comes into contact with the annular wall forming the rod insertion hole 52 from the lower side.

The rod return mechanism 9B is provided with a taper part 90 as guided portion which is formed in the longitudinal central portion of the clamping rod 3B and a sphere 91 as guide which is mounted to the right inner wall of the rod insertion hole 52 in the head 50 and guides the taper part 90 for switching the clamping rod 3B to the clamp release position.

The actions and advantages of the clamping device 1B will be described next.

As shown in FIG. 9, the piston 4B which is elastically energized downward by the spring 75 is located at the clamping position in a state in which oil pressure is not supplied to the oil pressure operating chamber 76, and the clamping rod 3B keeps a state moved to the right.

When a workpiece W is fixed to the work fixing platform T, first, oil pressure is supplied to the oil pressure operating chamber 76, and the piston 4B is driven upward against the force of spring 75. If the piston 4B is moved upward, the clamping rod 3B becomes movable to the left, the taper part 90 is guided by the sphere 91, and the clamping rod 3B is pressed and moved to the left. At this time, in the cam mechanism 7B, the roller 80 is entrapped into a notch near the inclined portion 81, the roller 80 and inclined portion 81 do not interfere with each other, and the leftward movement of the clamping rod 3B is allowed.

If the piston 4B is driven upward and reaches the clamp release position, the axial center of piston 4B is coincidental with the axial center of the rod insertion hole 52 to become the clamp release position, and the clamping rod 3B is held in this state. In this state, as shown in FIG. 7, the engagement portion 65 is inserted into a hole Wa of workpiece W, and the workpiece W becomes a state in which the engagement portion 65 approaches the inner wall Wb or a state in which the engagement portion 65 approaches the sidewall Wc of workpiece W from the left.

Next, if the oil pressure is relieved from the oil hydraulic operating chamber, the piston 4B is driven downward by the spring 75, in which case the driving force of spring 75 is boosted and transmitted to the clamping rod 3B, and the clamping rod 3B is driven to the right. Thus, as shown in FIG. 8, the engagement portion 65 is driven in the clamping direction by the driving force of spring 75, and the engagement portion 65 is pressed to and adheringly engaged with the inner wall Wb or side wall Wc of workpiece W, thus the workpiece W can be fixed to the work fixing platform T.

When the workpiece W is released from the work fixing platform T, the oil pressure is supplied to the oil hydraulic operating chamber 76, as described above, the piston member 4B is driven upward, and the engagement portion 65 is driven in the clamping release direction, thereby releasing the workpiece W from the work fixing platform T. The clamping device 1B has about the same effect as the clamping device 1 of Embodiment 1.

In the cam mechanism 7B, a sphere may also be rotatably mounted to the clamping main body 2B, in which case, the inclined portion 81 may also be formed into a tapered groove having a bottom with an arc-like cross-section where the sphere is engaged in the form of linear contact.

Figure 10:
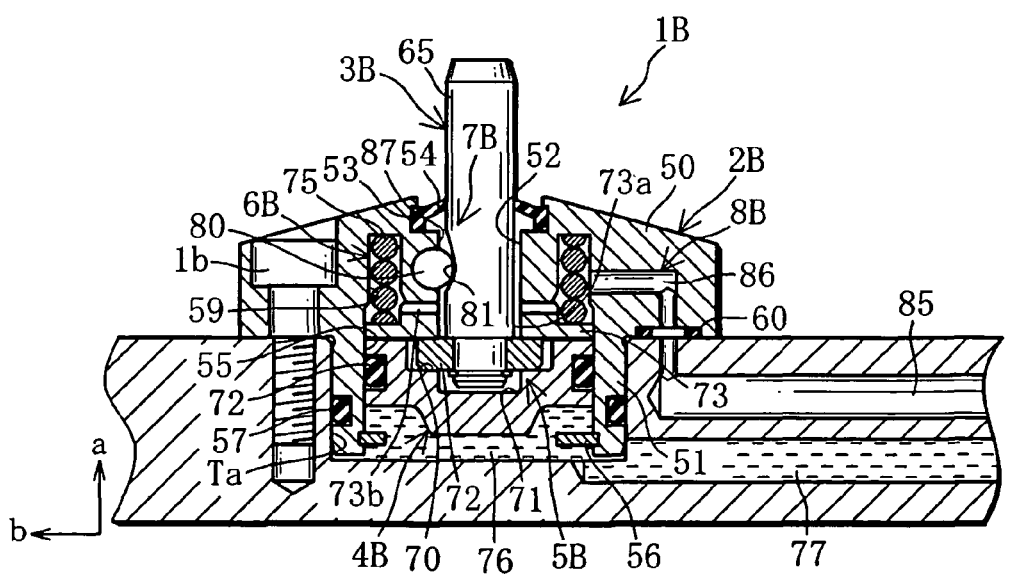
FIG. 10~FIG. 13 are vertically sectional view of the clamping devices relating to modified embodiments.

[3] Modifications in which Embodiments 1 and 2 are partially changed (1) As shown in FIG. 10, the tapered part as the guide d portion of the rod return mechanism and the sphere as guide may also be omitted in the clamping device 1B. In this case, the clamping rod 3B can also be returnably constructed to the clamp release position with an elastic force of annular sealing member 54 mounted to the seal mounting cavity 53. In the clamping devices 1 and 1A, the guided portion and the guide of rod return mechanism may be omitted, and the function of returning the clamping device 1B to the clamp release position is obtained as described above.

Figure 11:
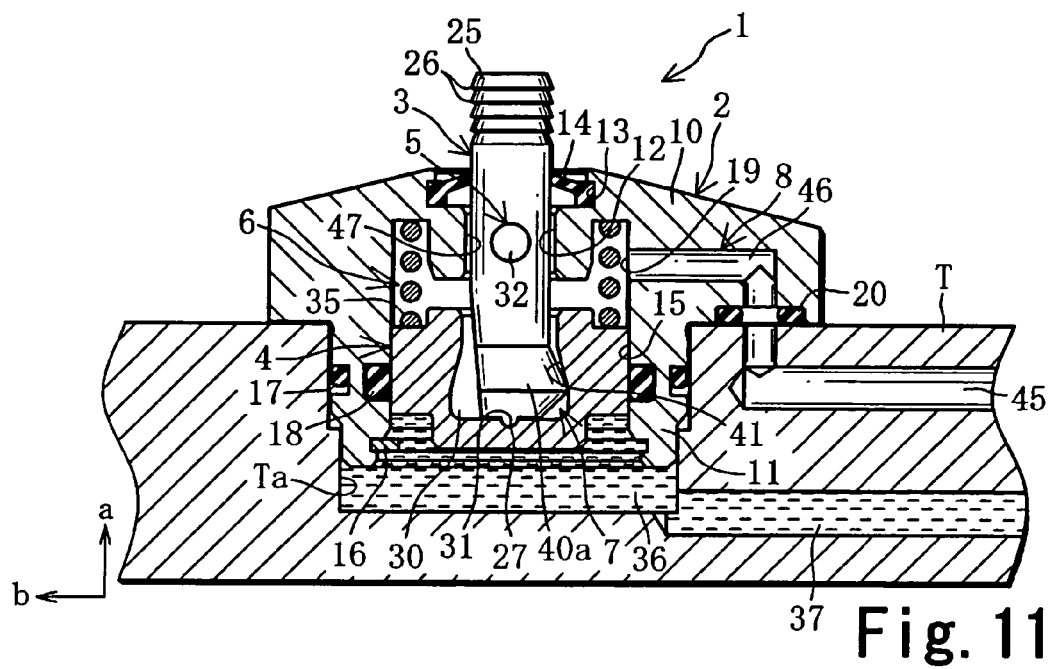

(2) As shown in FIG. 11, in the cam mechanism 7 of the clamping device 1, a follower 40a having the same function as the sphere 40 may also be integrally formed at the lower end portion of the clamping rod 3 so as to bulge out to the inclined portion 41 side in place of the sphere 40.

(3) In the cam mechanism 7B of the clamping device 1B, a follower having the same function as the roller 80 may also be integrally formed so as to bulge out to the inclined portion 41 side in the clamping main body 2B in place of the roller 80.

(4) In the rod return mechanism 9B of the clamping device 1B, a guide having the same function as the sphere 91 may also be integrally formed so as to bulge out to the inclined portion 41 side in the clamping main body 2B in place of the sphere 91.

(5) In the clamping device 1, the rod return mechanism 9 may also be omitted and a rod return mechanism which is the same as the rod return mechanism 9B of the clamping device 1B may also be provided.

(6) In the rod return mechanism, a spring which elastically energizes the clamping rod simply to the clamp release position may also be mounted. The energization force of the spring in this case is set to a force fairly smaller than the clamping force of the clamping rod.

Figure 12:
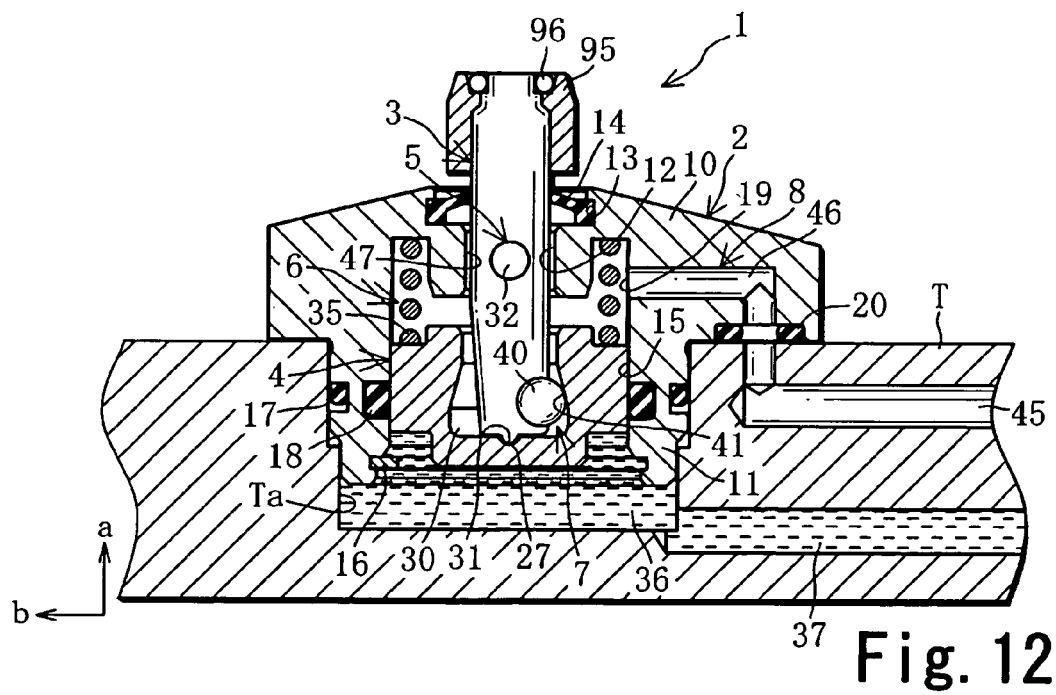

(7) The size and shape (e.g., the shape of top-end portion of the clamping rod) may be properly set up, for example, as shown in FIG. 12, a cap-like top-end member 95 is mounted to the top-end portion of the clamping rod, and the top-end member 95 may also be provided by stopping to pull it out with a stop ring 96.

Figure 13:
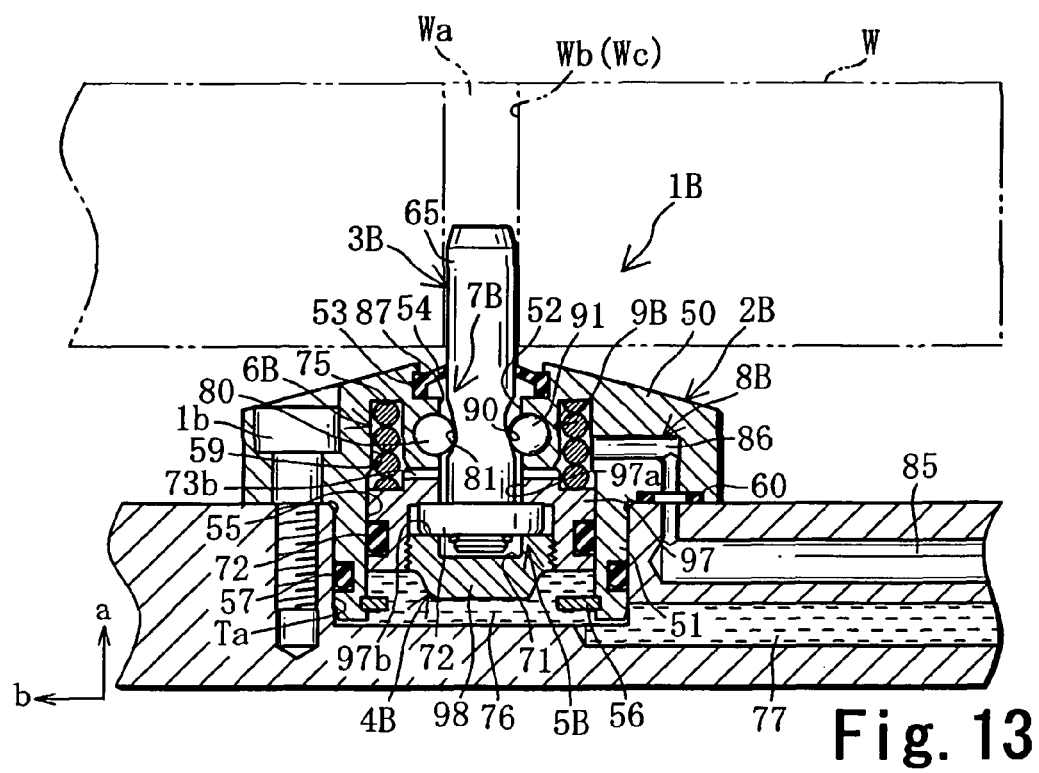

(8) The clamping device 1B of Embodiment 2 may be modified as in FIG. 13. The piston 4B comprises a cylindrical first piston part 97 and a second piston part 98 which is screwed and integrated with the first piston part 97 from below. A rod insertion hole 97a is formed in the first piston part 97, and a slide cavity 97b partially enclosed by the first and second piston part 97, 98 is formed downward of the rod insertion hole 97a. A slide member 72 mounted or integrally formed at the base end portion of the clamping rod 3B is slidably mounted in the lateral direction in the slide cavity 97b to construct a rod support 5B. In addition, various pistons are applicable to slidably support the base portion end of the clamping rod 3B in the lateral direction.

(9) The rod support mechanism may also rotatably support the base end portion of the clamping rod on the piston.

(10) The rod support mechanism may also slidably support the longitudinal midway portion of the clamping rod on the clamping main body in the rod rectangular direction.

(11) The piston drive mechanism may have an oil hydraulic operating chamber which drives the piston to the clamping position so that the engagement portion of the clamping rod moves in the clamping direction and a spring which elastically energizes the piston to the clamp release position relative to the clamping main body so that the engagement portion of the clamping rod moves in the clamping release direction.

(12) The piston drive mechanism may also have a first oil hydraulic operating chamber which drives the piston to the clamping position so that the engagement portion of the clamping rod moves in the clamping direction and a second oil hydraulic operating chamber which drives the piston to the clamp release position so that the engagement portion of the clamping rod moves in the clamping release direction.

(13) The cam mechanism may also have a sphere or a roller rotatably mounted to the piston and an inclined portion formed in the clamping rod so that the sphere or roller makes contact.

[4] Embodiment 3

Figure 14:
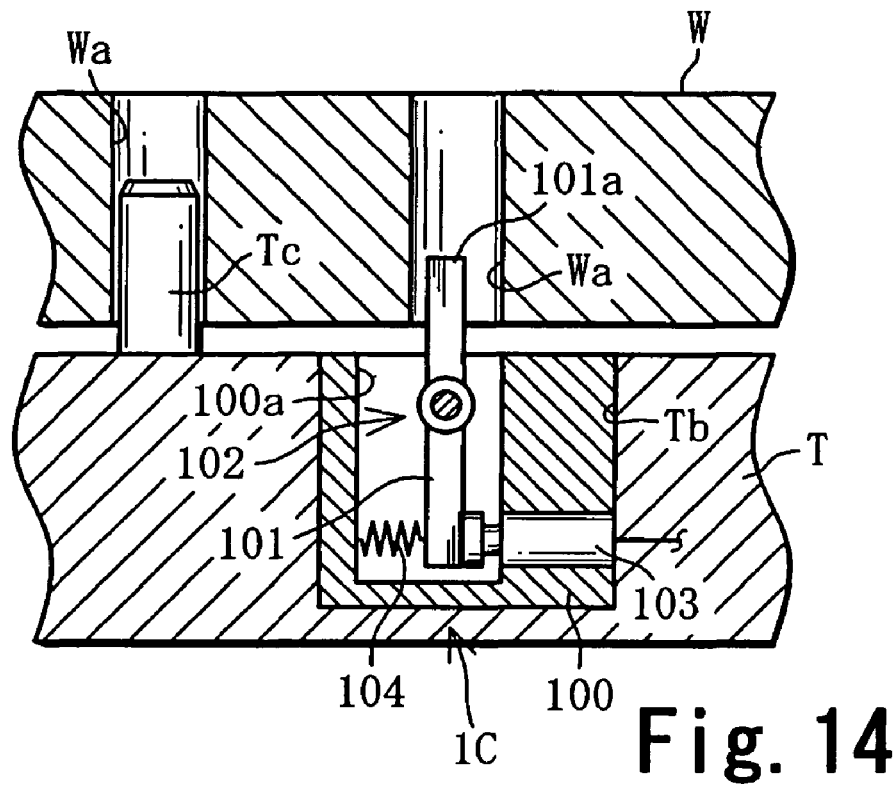
FIG. 14 and FIG. 15 are vertically sectional views of a base including a clamping device relating to Embodiment 3.
Figure 15:
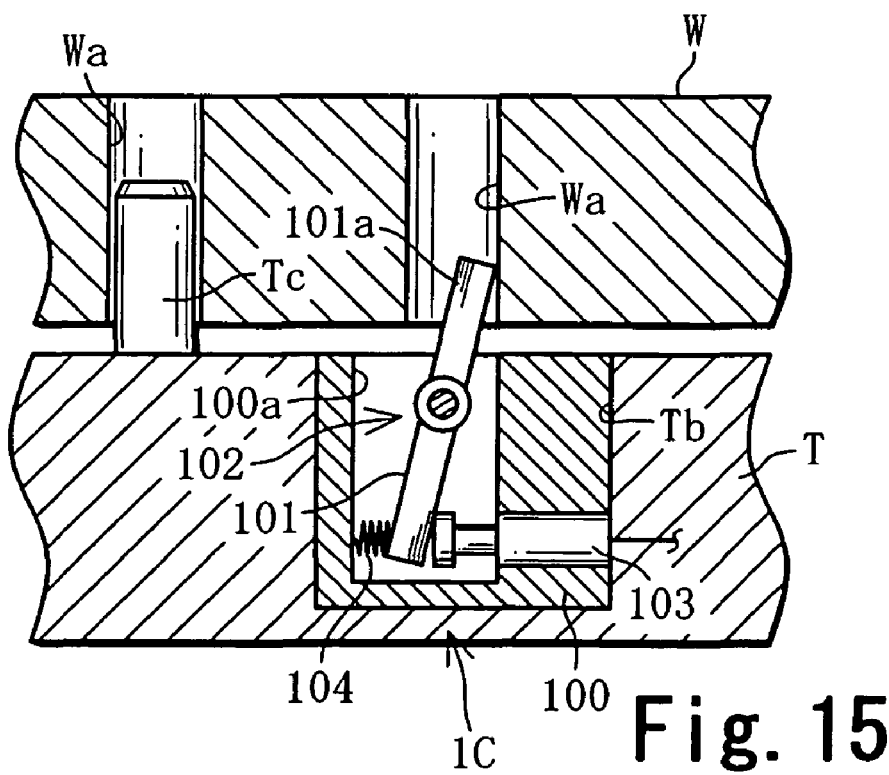

As shown in FIG. 14, 15, the clamping device 1C is provided with a clamping main body 100 which is fixed to a work fixing platform T as a base, a clamping rod 101 vertically mounted to the clamping main body 100 and is formed with an engagement portion 101a capable of engaging with the inner wall or side wall of the hole Wa of a workpiece W (a clamping object), a rod support 102 which moves the engagement portion 101a of the clamping rod 101 in a direction roughly rectangular to the longitudinal direction of the clamping rod 101 and switchably supports the clamping rod 101 in the clamping main body 100 across a clamping position (see FIG. 15) and a clamping release position (see FIG. 14), and an oil hydraulic cylinder 103 and a return spring 104 as the driving means for driving the clamping rod 101 across the clamping position and the clamping release position.

The clamping main body 100 is fitted to a cavity Tb formed in the work fixing platform T, most of the clamping rod 101 is received in a mounting cavity 100a formed in the clamping main body 100, and the engagement portion of the clamping rod 101 protrudes upward of clamping main body 100 (work fixing platform T). The rod support 102 rotatably supports the longitudinal midway portion of the clamping rod 101 in the clamping main body 100.

The oil hydraulic cylinder 103 is arranged at a position where it is capable of pushing the base end of the clamping rod 101, the clamping rod 101 is driven to rotate to the clamping position by pushing the base end of the clamping rod 101, and the engagement portion 101a is engaged with the inner wall of the hole Wa. If the driving force due to the oil hydraulic cylinder 103 is released, the clamping rod 101 is rotationally driven and returned to the clamping position by the return spring 104. Moreover, the clamping main body 100 may be omitted and the clamping rod 101 may be mounted to and rotatably supported in the work fixing platform T. The clamping rod 101 may also be rotationally energized to the clamping position by the spring and driven to the clamp release position by an actuator, such as an oil hydraulic cylinder, etc.

Here, a clamping method for fixing the workpiece W to the work fixing platform T by the clamping device 1C will described.

One or plural holes Wa are provided in the workpiece W, corresponding to one or plural holes Wa among these plural holes Wa, one or plural guide rods Tc and one or plural clamping device 1C are provided and one or plural clamping rods 101 are movably provided in the work fixing platform T. One or plural guide rods Tc are fastened to the work fixing platform T.

When the workpiece W is fixed in the work fixing platform T, first, as shown in FIG. 14, the guide rod Tc is inserted into the hole of workpiece W, the clamp rod 101 is inserted into another hole Wa of workpiece W, and subsequently, the clamp rod 101 is driven by the oil hydraulic cylinder 103 in a direction roughly rectangular to its longitudinal direction.

If so, as shown in FIG. 15, the engagement portion 101a of top-end of the clamping rod 101 is engaged with the inner wall of the hole Wa, the workpiece W is aligned by the guide rod Tc and fixed to the work fixing platform T. Here, when plural clamping devices 1C are provided, the workpiece W is reliably aligned and fixed to the work fixing platform T by the guide rod Tc by driving plural clamping rods 101 in the same direction. This clamping method enables aligning and fixing the workpiece W reliably to the work fixing platform T, without clamping the workpiece by pressing it down from above, therefore distortion of workpiece W due to clamping becomes very small and highly accurate surface processing can be applied to the workpiece W.

Since the clamping rod 101 is inserted into the hole Wa of workpiece W to fix the workpiece W to the work fixing platform T, the clamping rod 101, etc. is not exposed to the surface side of workpiece W. Accordingly, a processing tool does not interfere with the clamping rod 101, etc., making it becomes possible to apply processing to nearly the entire surface of workpiece W.

Since the processing tools do not interfere with clamping rod 101, etc., it becomes possible to eliminate extra movement of the tools to avoid the interfere and shorten the processing time, such as air cut time, etc. of workpiece W, making it possible to fix a workpiece W of about the same size as the surface area of work fixing platform T to the work fixing platform T. Moreover, the clamping method can be achieved to give the same advantages as that referred to above by applying the clamping devices 1, 1A, 1B in place of the clamping device 1C.

Figure 16:
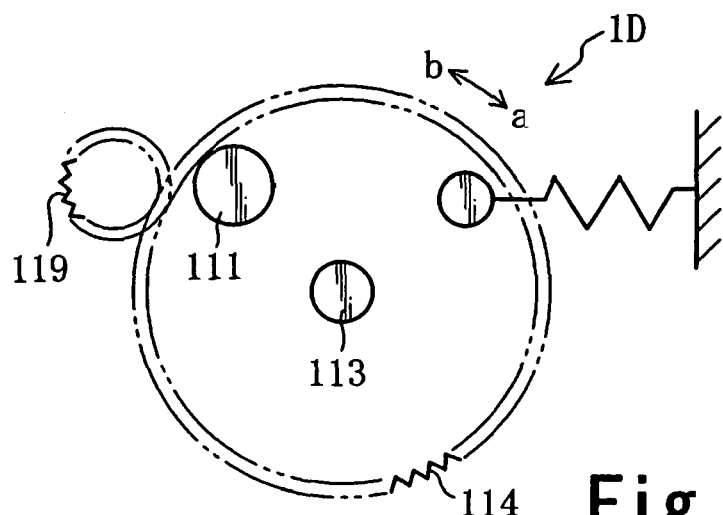
Figure 17:
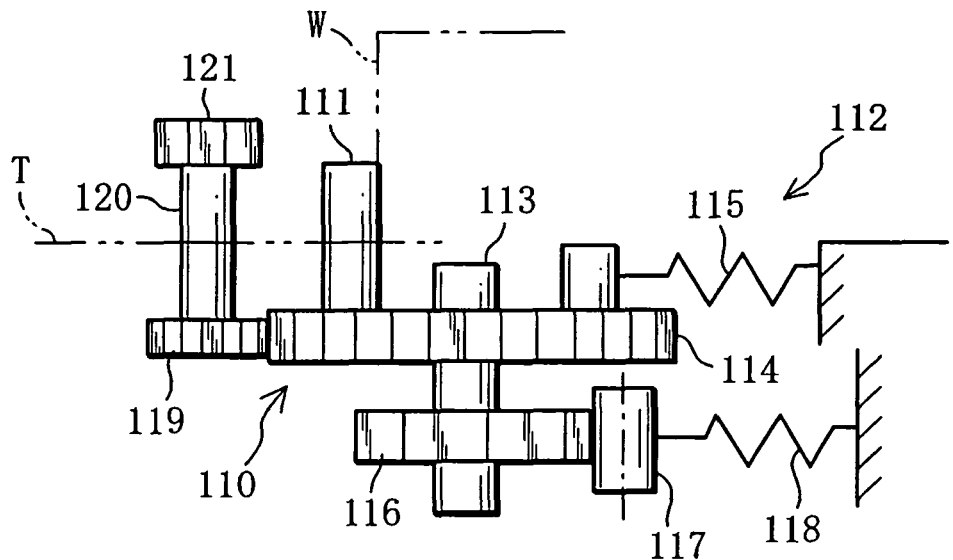
Figure 18:
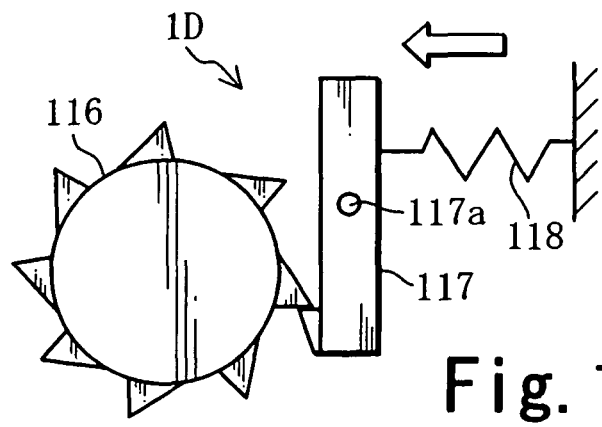
Figure 19:
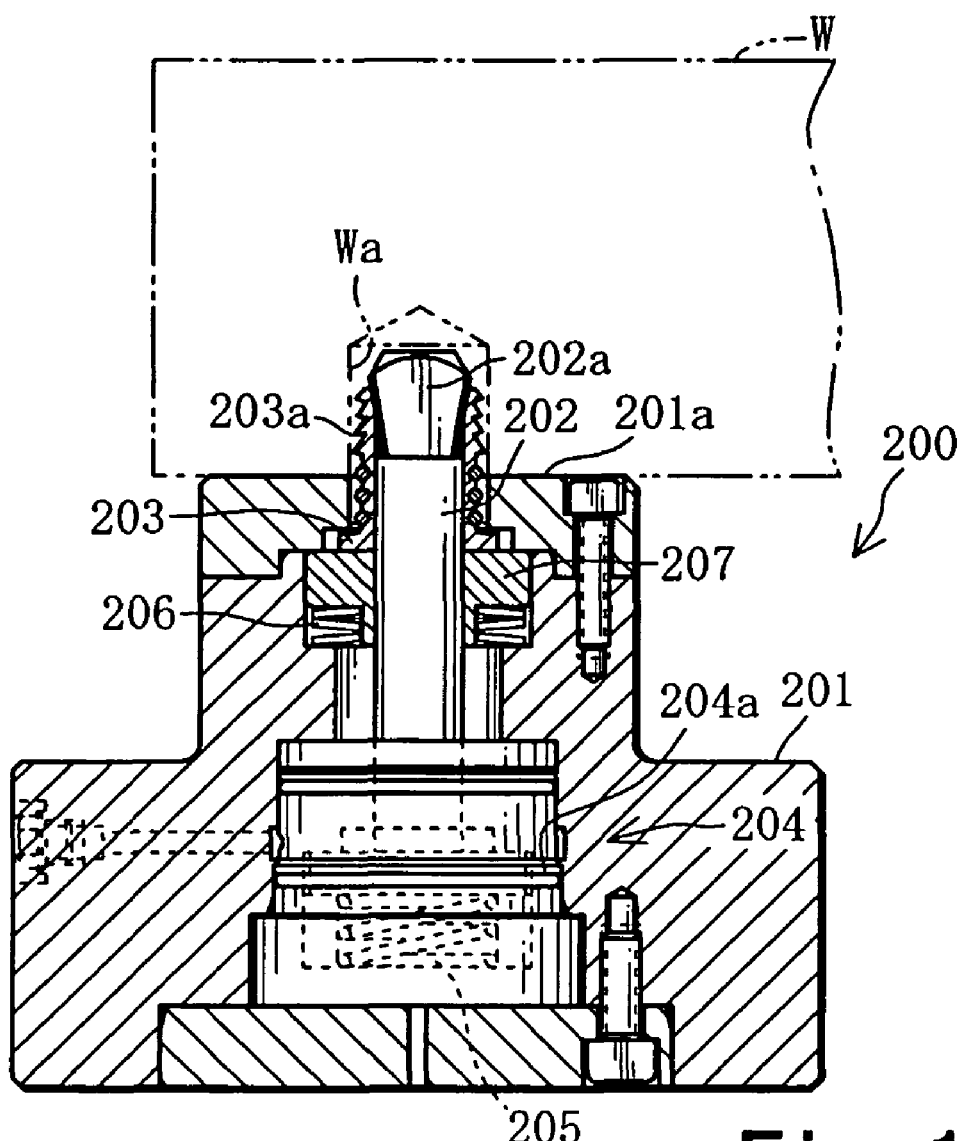
FIG. 19 is a vertically sectional view of a clamping device relating to the prior art.

[5] Embodiment 4 (see FIG. 16~FIG. 18)

As shown in FIG. 16~FIG. 18, the clamping device 1D is a clamping device for fixing a workpiece W to a work fixing platform T as a base for loading or holding the workpiece W and is provided with a clamping main body 110, a clamping rod 111 provided vertically in the clamping main body 110 and a clamping rod drive mechanism 112 which moves the clamping rod 111 to the work fixing platform T and holds it in position after movement, and it is so constituted that at least a part of the clamping rod 111 is brought into contact with the inner wall or outer wall of an open space provided in the workpiece W.

The clamping main body 110 is provided with a spindle 113 rotatably supported in the work fixing platform T and a large gear 114 where the spindle 113 is fixed to the central part as an internal embedment, and the clamping rod 111 is vertically provided at the large gear 114.

The clamping rod drive mechanism 112 is constructed by a clamping spring 115 which rotationally energizes the large gear 114 in the direction of arrow a, a ratchet member 116 where the spindle 113 is fixed to the central part as an internal embedment, an engagement member 117 which is rotatably supported in the work fixing platform T with a shaft 117a and releasably engaged with teeth of ratchet member 116 and restrict the ratchet member 116 (large gear 114) so that it does not rotate in the direction of arrow a, a ratchet spring 118 which energizes the engagement member 117 in a direction engaging the teeth of ratchet member 116, a small gear 119 engaged with the large gear 114, and a nut member 121 which is fixed to the small gear 119 via the operating shaft 120 and rotated by an outside operating unit such as nut runner, etc.

If the engagement member 117 is rotated against the energization force of ratchet spring 118 by any operating mechanism and the engagement member 117 is disengaged from the teeth of ratchet member 116 in a state in which the workpiece W is set to a prescribed position of work fixing plat-form T, the large gear 114 is rotated by the clamping spring 115 and moves the clamping rod 111 until it makes contact with the workpiece W, and the clamping rod 111 is powerfully engaged with the workpiece W by the energization force of clamping spring 115 and the workpiece W is fixed to the work fixing platform T.

If the nut member 121 is rotated by the nut runner to rotate the small gear 119 and the large gear 114 is rotated in the direction of arrow b, the clamping rod 111 separates from the workpiece W, the workpiece W is released and detachment of workpiece W becomes possible.

At this time, the engagement member 117 is engaged with the teeth of ratchet member 116, therefore the clamping rod 111 is held in position with almost no rotation of the large gear 114 in the direction of the arrow a even if the fixing release operation is stopped by the nut runner.

Moreover, it is also possible to embody the invention by adding various modifications within parameters in which there is no deviation from the purpose of the present invention.

What is claimed is:

1. A clamping device for fixing a clamping object to a base by releasably engaging with an inner wall of a hole or a side wall formed in the clamping object, the clamping device comprising:

a clamping main body fixed to the base and which is communicatingly formed with a rod insertion hole and a piston receiving cavity;

a clamping rod which is inserted through the rod insertion hole of the clamping main body, a top-end portion of the clamping rod protruding from the clamping main body, the top-end portion being provided with an engagement portion engageable with the inner wall of the hole or the side wall;

a piston member movably mounted in the piston receiving cavity of the clamping main body;

a rod support mechanism which includes a pivot about which said clamping rod is movable and which moves the engagement portion of the clamping rod in a direction roughly rectangular to the longitudinal direction of the clamping rod and switchably supports the clamping rod in the clamping main body or the piston member between a clamping position of the clamping rod and a clamp release position of the clamping rod;

a piston driving mechanism for driving the piston member between a first position corresponding to the clamping position of the clamping rod and a second position corresponding to the clamp release position of the clamping rod, the piston driving mechanism being provided with a spring which urges the piston member to the first position corresponding to the clamping position of the clamping rod and with a hydraulic chamber for driving the piston member to the second position corresponding to the clamp release position of the clamping rod by hydraulic pressure; and a cam mechanism for driving the engagement portion of the clamping rod in a clamping direction roughly rectangular to the longitudinal direction of the clamping rod by a driving force of the piston driving mechanism driving the piston member to the first position.

2. The clamping device according to claim 1, further comprising a rod return mechanism for returning the clamping rod to the clamp release position when the piston member is moved to the clamp release position.

3. The clamping device according to claim 2, wherein the rod support mechanism is constituted so as to rotatably support a longitudinal midway portion of the clamping rod on the clamping main body.

4. The clamping device according to claim 3, wherein the cam mechanism is provided with a sphere or a roller rotatably mounted on a base end portion of the clamping rod and an inclined portion being formed in the piston member so that the sphere or the roller makes contact therewith.

5. The clamping device according to claim 3 or 4, wherein the rod return mechanism is provided with a guided portion provided in the clamping rod and a guide provided in the piston member, which guides the guided portion and switches the clamping rod to the clamp release position.

6. The clamping device according to claim 2, wherein the rod support mechanism is constituted so as to slidably support the base end portion of the clamping rod on the piston member in a direction rectangular to the longitudinal direction of the clamping rod.

7. The clamping device according to claim 6, wherein:
the cam mechanism is provided with a sphere or a roller rotatably mounted on the inner wall of the rod insertion hole of the clamping main body, and
an inclined portion is formed in the clamping rod so that the sphere or roller makes contact therewith.

8. The clamping device according to claim 6 or 7, wherein:
the rod return mechanism is provided with a guided portion provided in the clamping rod, and
a guide is provided in the clamping main body, which guides the guided portion and switches the clamping rod to the clamp release position.

9. The clamping device according to any one of claims 1-4, wherein the piston driving mechanism is provided with an oil hydraulic operating chamber for driving the piston member to the clamp release position.

10. The clamping device according to any one of claims 1-4, wherein the engagement portion of the clamping rod is provided with plural annular edges.

11. The clamping device according to any one of claims 1-4, wherein an annular sealing member for sealing a space between the clamping main body and the clamping rod is fitted in the top-end portion of the rod insertion hole in the clamping main body.

12. The clamping device according to any one of claims 1-4, wherein an air blowing means is provided for jetting air to a top end side of the rod insertion hole through an air passage between the clamping main body and the clamping rod.

13. A clamping device for fixing a clamping object to a base by releasably engaging with an inner wall of a hole or a side wall formed in the clamping object, the clamping device comprising:

a clamping main body fixed to the base and which is communicatingly formed with a rod insertion hole and a piston receiving cavity;

a clamping rod which is inserted through the rod insertion hole of the clamping main body, a top-end portion of the clamping rod protruding from the clamping main body, the top-end portion being provided with an engagement portion engageable with the inner wall of the hole or the side wall;

a piston member movably mounted in the piston receiving cavity of the clamping main body;

a rod support mechanism which includes a pivot about which said clamping rod is movable and which moves the engagement portion of the clamping rod in a direction roughly rectangular to the longitudinal direction of the clamping rod and switchably supports the clamping rod in the clamping main body or the piston member between a clamping position of the clamping rod and a clamp release position of the clamping rod;

a piston driving mechanism for driving the piston member between a first position corresponding to the clamping position of the clamping rod and a second position corresponding to the clamp release position of the clamping rod, the piston driving mechanism being provided with a spring which urges the piston member to the first position corresponding to the clamping position of the clamping rod and with a hydraulic chamber for driving the piston member to the second position corresponding to the clamp release position of the clamping rod by hydraulic pressure, said spring being mounted around the clamping rod between the clamping main body and the piston member; and a cam mechanism for driving the engagement portion of the clamping rod in a clamping direction roughly rectangular to the longitudinal direction of the clamping rod by a driving force of the piston driving mechanism driving the piston member to the first position, said cam mechanism being provided with a sphere or a roller rotatably mounted on a base end portion of the clamping rod, and an inclined portion being formed in the piston member so that the sphere or the roller makes contact therewith, said inclined portion being inclined so as to press the sphere or the roller toward the clamping rod when the piston member moves toward the hydraulic chamber by the urging force of the spring.

* * * * *